United States Patent
Wilson

(10) Patent No.: US 6,385,340 B1
(45) Date of Patent: *May 7, 2002

(54) VECTOR CORRELATION SYSTEM FOR AUTOMATICALLY LOCATING PATTERNS IN AN IMAGE

(75) Inventor: Stephen S. Wilson, Ann Arbor, MI (US)

(73) Assignee: Applied Intelligent Systems, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/477,542

(22) Filed: Jan. 4, 2000

Related U.S. Application Data

(63) Continuation of application No. 08/556,367, filed on Nov. 13, 1995, now Pat. No. 6,023,530.

(51) Int. Cl.[7] .................................................. G06K 9/62

(52) U.S. Cl. ........................ 382/218; 382/278; 382/291

(58) Field of Search ................................ 382/219, 291, 382/181, 209, 213, 215, 216, 217, 218, 220, 221, 278

(56) References Cited

U.S. PATENT DOCUMENTS

| | | | | |
|---|---|---|---|---|
| 4,706,296 A | * | 11/1987 | Pedotti et al. ............... | 382/278 |
| 5,046,109 A | * | 9/1991 | Fujimori et al. ............ | 382/216 |
| 5,173,949 A | * | 12/1992 | Peregrim et al. ........... | 382/209 |
| 5,317,652 A | * | 5/1994 | Chatterjee ................... | 382/291 |
| 5,479,537 A | * | 12/1995 | Hamashima et al. ........ | 382/218 |
| 5,500,906 A | * | 3/1996 | Picard et al. ................ | 382/220 |
| 5,548,665 A | * | 8/1996 | Gion et al. .................. | 382/276 |
| 5,559,898 A | * | 9/1996 | Avi-Itzhak .................. | 382/218 |
| 5,600,733 A | * | 2/1997 | MacDonald et al. ........ | 382/209 |
| 5,754,677 A | * | 5/1998 | Kawada ....................... | 382/209 |
| 6,023,530 A | * | 2/2000 | Wilson ........................ | 382/219 |

OTHER PUBLICATIONS

J.Y. Lettvin et al, Proceedings of the Ire; *What The Frog's Eye Tells The Frog's Brain*, Nov. 1940.
Stephen S. Wilson, *Vector Morphology and Iconic Neural Networks*, vol. 19, No. 6; Dec. 1989.
Robotics World, Summer 1998, vol. 16, No. 2.
K.L. Boyer et al; *Color–Encoded Structured Light For Rapid Range Map Computation*; Purdue University; Technical Report TR–EE–84–37; Dec. 1984.
K.L. Boyer et al; *A Knowledge Based Robotic Vision System*; Purdue University; 1984.
H.S. Lang et al; *Range Data Extraction And Interpretation By Structured Light*; Purdue University; 1984.
Gregg Kelly; *Wire Bonding Techniques*; Hybrid Circuit Technology; pp. 30–32; Aug. 1991.
*Die Bond Process*; ABOS Automation; pp. 1–5.
Daniel Cavasin; *Analyzing Measurement Systems*; Advanced Packaging; pp. 25–29; May/Jun. 1994.
ESD on the Mark; vol. 2, No. 3; pp. 1–4; May/Jun. 1989.
The C Users Journal; vol. 8, No. 1; pp. 53–62; Jan. 1990.
Larry A. Schmitt; *A Comparison of Correlation Techniques For Locating Shapes And Patterns In Images*; Applied Intelligent Systems, Inc.; No. 31; Nov. 1990.
Georg Schlaffer et al; *Machine Vision In the Process*; European Semiconductor; Oct. 1994.

(List continued on next page.)

*Primary Examiner*—Jon Chang
(74) *Attorney, Agent, or Firm*—Young & Basile

(57) ABSTRACT

The present invention relates to a combined approach of image and template correlation, and vector correlation wherein edge detection and pattern searching are joined in a single operation to provide great flexibility without requiring extensive computational facilities. A template is devised from a sparse set of coordinate points that model only the important edges of an object to be located within an image. Different templates are dynamically reconstructed as an estimation of the object location within the image becomes more precise.

3 Claims, 3 Drawing Sheets

OTHER PUBLICATIONS

*The Fab Of The Future*; Solid State Technology; Jan. 1995.

Larry Schmitt et al; *Putting Vision–Based Process Control On–Line*; Applied Intelligent Systems, Inc.; Solid State Technology; Jul. 1995.

Pete Lister et al; *Next–Generation Vision Algorithms For SMT Assembly*; Electronic Packaging & Production; Feb. 1992.

R.J. Barton et al; *A Path To Six Sigma Quality In Assembly Operations*; Semiconductor International; Oct. 1995.

*Validmark Automated Print Inspection Application Overview*; Applied Intelligent Systems, Inc.; May 1990.

X. Ferandez et al; *Automatic Visual Inspection Of Centering Marks Engraved On Ophthalmic Lenses*; SPIE vol. 2249 Automated 3D and 2D Vision, 1994.

Larry Schmitt; *Neural Networks For Intelligent Vision*; Applied Intelligent Systems, Inc.

*Point–And–Click Vision Development*; Applied Intelligent Systems, Inc.

*AIS–630 Vision Computer*; Applied Intelligent Systems, Inc.

Larry Schmitt; *A Vision Of Vision In The Gigabit ERA*; Semiconductor International; Jun. 1993.

Larry Schmitt et al; *Putting Vision–Based Process Control On–Line*; Solid State Technology; Jul. 1995.

R.J. Barton et al; *Vision And Process Control For Back–End Assembly*; European Semiconductor; Oct. 1994.

Jim Anderson; *Intelligent Perception*; Advanced Imaging; May 1991.

*AISI's Neural Net Reads Wafer Codes*; Electronic Engineering Times; CMP Publication; Issue 698; Jun. 22, 1992.

*AISI Vision Computers*; Applied Intelligent Systems, Inc.; Specification sheet.

*Vision Capabilities*; Applied Intelligent Systems, Inc.

Applied Intelligent Systems, Inc. paper.

Larry Schmitt; *A Vision Of Vision In The Gigabit ERA*; Seeing Beyond; Applied Intelligent Systems, Inc.; 1992.

Larry Schmitt; *The Process Of Vision In The Age Of 1000 Leads*; Seeing Beyond, Applied Intelligent System, Inc.; 1992.

Stephen S. Wilson; *One–Dimensional SIMD Architectures*; Applied Intelligent Systems, Inc.; Technical Report No. 26, Chapter 9; pp. 131–149.

Stephen S. Wilson; *Morphological Networks*; Applied Intelligent Systems, Inc.; Technical Report No. 30; Nov. 1990.

Stephen S. Wilson; *Teaching Network Connections For Real Time Object Recognition*; Technical Report No. 34; Sep. 1990.

Larry A. Schmitt; *The Practical Application of Grayscale Morphology To The Inspection Of Surfaces*; Technical Report No. 35; 1990.

Chuck R. Tuckey; *Machine Vision Improves Surface Mount Placement Automation*; Technical Report No. 36; Jul. 1990.

Stephen S. Wilson; *Massive Parallelism In Machine Vision*; Applied Intelligent Systems, Inc.; Technical Report No. 38; 1990.

Stephen S. Wilson; *Training Of Object Classes Using Mathematical Morphology*; Applied Intelligent Systems, Inc.; Technical Report No. 41; Jan. 1992.

Stephen S. Wilson; *Neural Network Computations On A Fine Grain Array Processor*; Applied Intelligent Systems, Inc.; Technical Report No. 40; Mar. 1991.

Stephen S. Wilson; *Vector Morphology And Iconic Neural Networks*; IEEE Transactions on Systems, Man, and Cybernetics, vol., 19, No. 6.; pp. 1636–1644; Nov./Dec. 1989.

Stephen S. Wilson; *Neural Computing On A One Dimensional SIMD Array*; 1989.

Stephen S. Wilson; *Massive Parallelism In Machine Vision*; Technical Paper MS90–586; Nov. 1990: pp. 7–43–7–54.

Stephen S. Wilson; *Unsupervised Training Of Structuring Elements*; SPIE vol., 1568; Image Algebra and Morphological Image Processing II; pp. 188–199; 1991.

Stephen S. Wilson; *Teaching Network Connectivity Using Simulated Annealing On A Massively Parallel Processor*; Mar. 1990.

Stephen S. Wilson; *Order Statistic Filters On Matrices Of Images*; SPIE/SPSE's Symposium on Electronic Imaging: Science & Technology, vol. 1451; Feb. 24–Mar. 1, 1991.

Stephen S. Wilson; *Theory Of Matrix Morphology*; IEEE Transactions on Pattern Analysis and Machine Intelligence; vol. 14, No. 6; Jun. 1992; pp. 636–652.

Stephen S. Wilson; *Floating Stack Arrays: A Unified Representation Of Linear And Morphological Filters*; Proc. of SPIE 1796, Image Algebra and Morphological Image Processing III, Jul. 1992.

Stephen S. Wilson; *Gray Level Image Enhancement Using A Projected Thickening*; SPIE Nonlinear Image Processing IV; Feb. 1993; pp 20–29.

Stephen S. Wilson; *Partial Closing Filters For Image Restoration*; Nonlinear Image Processing IV, IS&T/SPIE Proc. vol. 2424; Feb. 1995.

Stephen S. Wilson; *Training Of Object Classes Using Mathematical Morphology*; SPIE/SPSE Symposium on Electronic Imaging; Science & Technology, vol. 1658, Feb. 1992.

Stephen S. Wilson; *Gray Level Noise Filtering With Vector Openings*; Image Algebra and Morphological Image Processing IV; Proc. of SPIE, vol. 2030.

Stephen S. Wilson; *Morphological Hopfield Nets*; Image Algebra and Morphological Image Processing V; Proc. of SPIE, vol. 2300.

Stephen S. Wilson; *One Dimensional SIMD Architectures— The AIS–5000*; Multicomputer Vision; Chapter 9; 1988.

Stephen S. Wilson; *Training Structuring Elements In Morphological Networks*; Chapter 1; Mathematical Morphology in Image Processing.

Stephen S. Wilson; *Neural Network Computations On A Fine Grain Array Processor*; Neural Networks for Perception, vol. 2, Computation, Learning and Architectures; pp 335–359.

Stephen S. Wilson; *Translation Invariant Neural Networks*; Fast Learning and Invariant Abject Recognition; Chapter 9, pp 125–151.

Stephen S. Wilson; *Morphological Networks*; Fuzzy Logic and Neural Network, 1995.

Stephen S. Wilson; *Matrix Morphology—Mathematical Morphology On Matrices Of Images*; Technical Report No. 39; Nov. 1990.

Hong Kyu–Chung et al; *Two–Stage High–Precision Visual Inspection Of Surface Mount Devices*; Journal of Electronic Imaging; vol. 6(4); pp 517–524; Oct. 1997.

David Coupland et al; *Machine Vision Inspection In A Fully Automated Test Line*.

Qi Tian et al; *Algorithms For Subpixel Registration*; Computer Vision, Graphics, and Image Processing 35. pp. 220–233; 1986.

Lorenz A. Schmitt et al; *The AIS–5000 Parallel Processor*; IEEE Transactions on Pattern Analysis and Machine Intelligence, vol. 10, No. 3, May 1988.

Stephen S. Wilson; *Unsupervised Training Of Structuring Elements*; SPIE, vol. 1568, Image Algebra and Morphological Image Processing II, 1991.

Stephen S. Wilson; *Teaching Network Connections For Real–Time Object Recognition*; Neural and Intelligent Systems Integration; Chapter 5; pp. 135–160; 1991.

Stephen S. Wilson; *Teaching Network Connectivity Using Simulated Annealing On A Massively Parallel Processor*; Proceedings of the IEEE, vol. 79, No. 4, Apr. 1991.

Chr. von der Marlsburg; *Self–Organization Of Orientation Sensitive Cells In The Striata Cortex*; Neurocomputing Foundations of Research; MIT Press, Chapter 17, pp. 210–227, 1973.

Ralph Linsker; *Self–Organization In A Perceptual Network*; IEEE Computer, Mar. 1988; pp. 105–117.

Ramakant Nevatia; *Machine Perception*; Perception of Brightness and Color; Prentice–Hall, Inc. 1982, pp. 95–99.

Teuvo Kohonen; *Adaptive, Associative, And Self–Organizing Functions In Neural Computing*; Applied Optics, vol. 26, No. 23, Dec. 1987, pp 4910–4917.

William K. Pratt; *Digital Image Processing*; Second Edition; A Wiley–Interscience Publication; 1991.

Simon Haykin; *Neural Networks*; Macmillan College Publishing Co., Inc., 1994.

David Marr; *Vision*; Neurocomputing Foundations of Research; MIT Press; pp., 19–38, 54–61, 1982.

Rama Chellappa et al; *Digital Image Processing And Analysis: vol. 2: Digital Image Analysis*; IEEE Catalog No. EHO232–9, 1985.

Havey et al. "Software Speedup Techniques for Binary Image Object Recognition" Proc. of Int. Conf. on Industrial Electronics, Control and Instrumentation, IECON'91, vo. 2591, pp. 1827–1831, Oct. 1991.*

Schils, "A Statistical Algorithm for Efficient Computation of Correlation," IEEE Trans on Signal Processing, vo. 40, No. 11, pp. 2857–2863, Nov. 1992.*

* cited by examiner

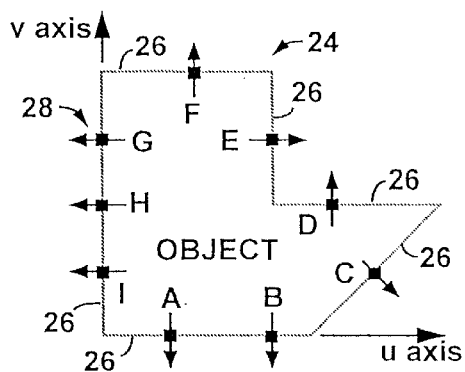
FIG. 3A
| vector # N | $u_i$ | $v_i$ | $\theta_i$ |
|---|---|---|---|
| A | 5 | 0 | 270 |
| B | 12 | 0 | 270 |
| C | 20 | 5 | 315 |
| D | 17 | 10 | 90 |
| E | 12 | 15 | 0 |
| F | 7 | 20 | 90 |
| G | 0 | 15 | 180 |
| H | 0 | 10 | 180 |
| I | 0 | 5 | 180 |
FIG. 3B
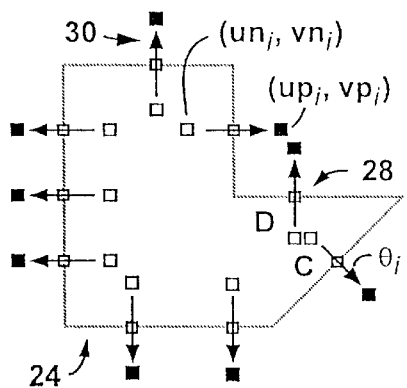
FIG. 3C
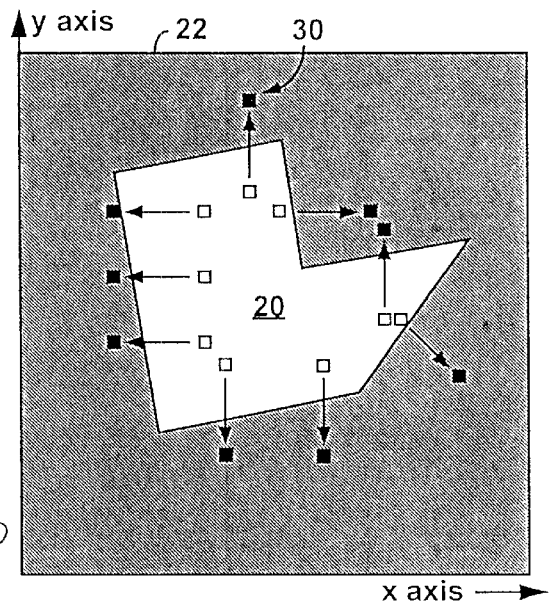
FIG. 3D
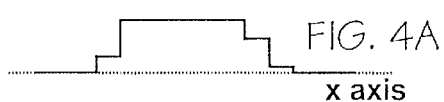
FIG. 4A
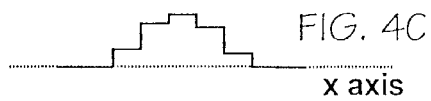
FIG. 4C
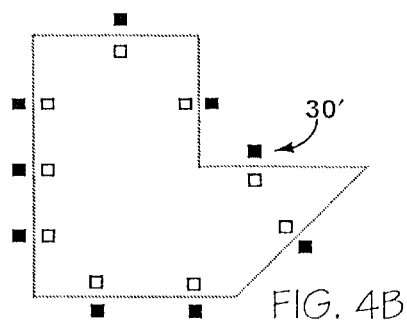
FIG. 4B

VECTOR CORRELATION SYSTEM FOR AUTOMATICALLY LOCATING PATTERNS IN AN IMAGE

CROSS REFERENCE TO CO-PENDING APPLICATION

This application is a continuation of application Ser. No. 08/556,367, filed Nov. 13, 1995, now U.S. Pat. No. 6,023,530 the entire contents of which are incorporated herein by reference.

TECHNICAL FIELD

The present invention relates to a system for digital processing of images and deals more particularly with a system for automatically locating patterns that are characterized by edges. A specially constructed template is moved about various points in the image to locate a pattern. As the template scans the image, it is altered in a manner that is dependent on how well it fits the image pattern at the various points.

BACKGROUND OF THE INVENTION

Introduction

In electronic digital image processing hardware, images are stored in discrete memory devices. The image is often segmented into an array of values, where each memory location corresponds to a particular spatial coordinate point and the value at that memory location, called a picture element (pixel), corresponds to the brightness of the image at that coordinate point. FIG. 1A shows an example of an object in an image where the brightness is given by numbers at each pixel coordinate point.

Image and Template Correlation

One common technique to automatically locate objects in an image of a machine vision system is to use a correlation or convolution. There are several types of image correlation methods including convolution, normalized correlation, the least mean squares error, and the least mean absolute error. A definition of a correlation method requires the determination and use of a template or kernel which is a separate small image with the same shape as the object to be located. FIG. 1B shows a template shaped like the object shown in the image of FIG. 1A. Like the object, the template may be represented by spatial coordinate points with a brightness value for each point. The template is selectively displaced and moved from location to location around a region of interest in the image. At each new template location in the image the sum of products is computed for the value of a template pixel with each corresponding image pixel at a common spatial coordinate point. FIG. 1C shows one location of the template in FIG. 1B displaced on the image. In this case there is no overlap at that displacement, and the sum of products is zero. The computational output of the correlation or convolution is at a maximum at the location where the shape of the template pattern most closely matches the shape of a pattern in the image. FIG. 1D shows the correlation for all possible displacements of the template across the image. The numeric values are rather large, so FIG. 1D shows only an approximate and relative indication of the correlation by the intensity of shading.

The formula for a discrete two dimensional convolution is given by $$corr(x, y) = \sum_u \sum_v I(x-u, y-v) K(u, v) \quad (1)$$

where I is an image, K is a kernel, and x and y are image coordinates defining a spatial coordinate point. The summation over u and v range over the template. In practice, the template is smaller than the image containing the object whose location is being determined.

Normalized correlation is a well known method similar to correlation, except that the value of each element of the template is multiplied by a constant scale factor, and a constant offset is added. At each template displacement the scale factor and offset are independently adjusted to give a minimum error in the correlation of the template at each image location. The normalized correlation method in template matching is covered in detail in an article entitled "Alignment and Gauging Using Normalized Correlation Search" by William Silver, in *VISION'87 Conference Proceedings*, pp. 5-33–5-55, which is incorporated herein by reference.

In the least mean squared error method each template point is subtracted from the corresponding image point; each difference is squared; and the average of all differences are computed. The formula for the least squared error is $$E^2(x, y) = \frac{1}{N} \sum_u \sum_v (I(x-u, y-v) - K(u, v))^2 \quad (2)$$

where N is the number of pixels in the kernel. The computational output of the least mean squared error is at a minimum where the template pattern matches a pattern in the image. In the least mean absolute error method each template point is subtracted from the corresponding image point; the absolute value of each difference is computed; and the average of all differences are computed. The formula for the least absolute error is $$E(x, y) = \frac{1}{N} \sum_u \sum_v \mathrm{abs} I(I)(x-u, y-v) - K(u, v) I \quad (3)$$

The computation output of the least mean absolute error is also at a minimum where the patterns match.

The techniques described above are substantially the same in the sense that a template, itself is a gray level image, is displaced from location to location about a corresponding gray level image containing an object whose coordinate location is within the image is of interest. At each location a function is applied to neighboring image pixel values and the corresponding template values at common coordinate points. The result is another image where each pixel at a coordinate point is a single number that represents how well the template fits the object in the image at that point.

Binary Vector Correlation

Vector correlation or convolution provides an alternative approach to the correlation methods discussed above. In vector correlation the image and selected template are composed of pixels which are vectors. The theory behind binary vector correlation is covered in a paper entitled "Vector Morphology and Iconic Neural Networks" by S. S. Wilson in *IEEE Transactions on Systems, Man, and Cybernetics*, November/December, 1989, vol. 19, no. 6, pp. 1636–1644, which is incorporated by reference. A similar technique was further discussed in the paper entitled "Teaching network connections for real-time object recognition", by S. S. Wilson in *Neural and Intelligent Systems Integration,* pp. 135–160, Wiley-Interscience, 1991. Briefly, the most common form of binary vector correlation consists of transforming a gray level image to several binary images, where the composite of binary images represents a vector in the sense that each pixel in the vector image has several components—each from one of the binary images. Next, a vector template is defined for the purpose of recognizing a pattern. The vector template also consists of the same number of components as the vector image.

The position of the vector template is displaced and moved from location to location around the region of interest in the image. At each location, the sum of inner products (or dot product) is computed for a vector pixel in the template and a vector pixel in the image for a corresponding coordinate point. In mathematical terms, the formula for a discrete two dimensional vector convolution is given by $$corr(x, y) = \sum_u \sum_v I(x-u, y-v) \cdot K(u, v) \qquad (4)$$

where I is a vector image and K is a vector kernel, and x and y are image coordinates. The summation over u and v range over the template.

A detailed description of one technique of vector correlation follows. Starting with an input image, the first step is to form another image called the horizontal finite difference by subtracting from the value of a pixel of the input image, the value of a neighboring pixel displaced a small distance to the right. The resulting image will contain large positive or negative values around those coordinate points where there is a significant vertical edge. A positive value in the horizontal finite difference image is called an east edge and represents an edge that decreases in intensity from left to right. A negative value in the horizontal finite difference image is called a west edge and represents an edge that increases in intensity from left to right.

The second step is to form another image called the vertical finite difference by subtracting from the value of a pixel of the input image, the value of a neighboring pixel displaced a small distance upward. The resulting image will contain large positive or negative values around those coordinate points where there is a significant horizontal edge. A positive value in the vertical finite difference image is called an north edge and represents an edge that decreases in intensity in the upward direction. A negative value in the vertical finite difference image is called a south edge and represents an edge that increases in intensity in the upward direction.

The third step in binary vector correlation is to form a binary vector image where each pixel contains a vector comprised of four binary numbers labeled N, S, E, and W which correspond to the four compass directions. The N binary number is computed by comparing the vertical finite difference to a small positive number called a threshold, and associating a binary 1 for those values that exceed the threshold, and a binary zero otherwise. The S binary component is computed by comparing the vertical finite difference to the negative of the threshold, and associating a binary I for those values that are smaller than the threshold, and a binary zero otherwise. The E and W binary components are computed in a similar manner using the horizontal finite difference image.

The fourth and final step is to displace the position of the vector template from location to location within a region of interest in the original image. At each new location in the image, the sum of inner products is computed for the value of each vector pixel in the template with each corresponding vector pixel in the original image for a corresponding coordinate point.

FIG. 2A is an example of a vector image after edge detection using both horizontal finite difference and vertical finite difference. Although each coordinate point in the image should illustrate a vector it is easier to illustrate only the label of the non-zero component. A coordinate point having a blank pixel represents a vector where all elements are zero. Although in practice it is possible for two components to be non-zero such as N and W, none are shown by way of example in FIG. 2A. FIG. 2B is a corresponding vector template formed using both the horizontal finite difference image and the vertical finite difference image and a predetermined threshold. It is apparent that when the template in FIG. 2B is moved from location to location about the image in FIG. 2A, the correlation response as roughly indicated in FIG. 2C will result.

Benefits-of Vector Correlation

Vector correlation is very accurate because the correlation is with the edges of a pattern. Referring to FIG. 2C a slight offset of the template from the actual location of the pattern in the image means that most of the edges of the template complete miss contact with the pattern and results in no correlation. However, as shown in FIG. 1D, there is a large area of partial contact of the image with the template if an ordinary correlation is used.

Vector correlation is very capable of locating degraded patterns in an image as long as the edges of the pattern are not severely degraded. A degraded image consists of a large amount of clutter surrounding the pattern of interest, or missing pieces within the pattern. An ordinary correlation may fail to distinguish the pattern from the surrounding clutter.

In an ordinary correlation a template image is used. Thus, template matching will fail to give accurate results if the visual nature of the object is substantially different from the object used as the template. Vector correlation is superior to ordinary correlation because only the important edge features of an object are used in identifying the object.

Problems with Vector Correlation

Vector correlation is computationally intensive because of the extra steps in forming and operating with vector images. First, there is an increased requirement for memory storage in order to store the finite differences and computed edges. Second, the templates used in characterizing patterns to be found are vectors and are more complex to define. Third, diagonal edges are not represented accurately. A diagonal in the north and east direction must be represented by a template that has both the north and east edges represented at the same point. A diagonal point in a template is more difficult to handle. Finally, the method is restricted to a high performance parallel processor.

The use of a small finite difference coordinate displacement encompassing one or two units produces very narrow edges in the finite difference images. As the correlation template is moved over the vector image, narrow edges allow a strong localization of the correlation, and leads to high accuracy of the pattern matching of the template to the image. However, since the pattern location is unknown, the template must be moved over a large number of positions, in general, before the pattern can be found. This is referred to as a fine grained search. The unknown pattern in this case might be lost if it is slightly rotated so that the template does not fit anywhere.

The finite difference can be made larger for simple images. For example, a finite difference coordinate displacement encompassing ten units would lead to edges that are ten pixels wide and allow rotated patterns to be found. Additionally, the pattern could be found by sampling the template over the image, not exhaustively, but in a coarse grid in steps encompassing up to ten units in both the horizontal and vertical directions. In this example, the search would be ten squared, or one hundred times faster. However the accuracy, once the pattern is found, would be very poor.

A compromise would be to provide a coarse grained search to get a rough location of the pattern, and then a fine grained search to zero in on the pattern. The edge detection would have to be performed twice, once for the large finite differences, and once for the small finite differences. A large amount of memory storage and a high performance parallel processor are still required.

SUMMARY OF THE INVENTION

The invention teaches a system for automatically locating objects within images. The images are defined by a plurality of image pixels, each image pixel having a known intensity value and a known coordinate point. The invention uses a combination of edge detection and pattern searching that are combined into a single operation to provide great flexibility with limited computational complexity. First, a manual template is determined which corresponds to an estimation of the object. The manual template is translated into an abstract template which is comprised of a sparse set of vectors comprising a set of coordinate points and corresponding edge directions. Each coordinate point lies on an edge of the manual template and a corresponding edge direction passes through the coordinate point perpendicular to the edge at the coordinate point. Next, the abstract template is converted into a ranging template. The ranging template comprises pairs of coordinate points which are defined to be equally spaced from the coordinate point for each vector of the abstract template along the corresponding edge direction. A positive coordinate point corresponds to a positive value of a preselected displacement and a negative coordinate point corresponds to a negative value of the same displacement.

The ranging template is displaced to each of a plurality of known coordinate point locations within the image. At each location the ranging template is correlated with the image. Different abstract and ranging templates are reconstructed dynamically and rotated as correlation improves and an estimation of the objects location within the image becomes more precise. The advantages of vector correlation are retained, but the computational burden is reduced since edge detection is eliminated and only a limited number of coordinate points are required. Less computational memory is required in part because edge detected images are not stored.

BRIEF DESCRIPTION OF THE DRAWINGS

The features and inventive aspects of the present invention will become more apparent upon reading the following detailed description, claims, and drawings, of which the following is a brief description:

FIG. 3A illustrates a manually determined template converted into a simplified vector form according to the present invention.

FIG. 3B illustrates a table for the abstract vector template of FIG. 3A.

FIG. 3C shows a ranging template derived from the abstract template of FIG. 3B having a displacement of $\delta=3$.

FIG. 3D shows the ranging template of FIG. 3C fitting an object which is off-set and rotated within an image.

FIG. 4A is a horizontal profile of the correlation for the ranging template of FIG. 3C.

FIG. 4B is a ranging template constructed with a displacement $\delta=1$.

FIG. 4C is a horizontal profile of the correlation for the ranging template of FIG. 4B.

DETAILED DESCRIPTION OF THE PREFERRED EMBODIMENTS

Figure 1A:
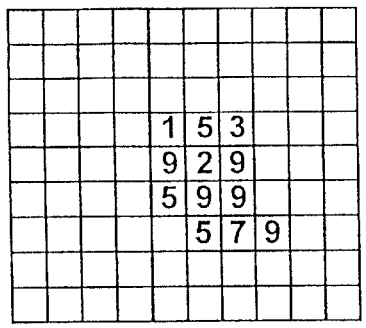
FIG. 1A is an example of a gray level image with an object.
Figure 1B:
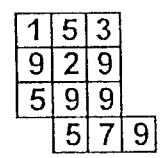
FIG. 1B is an example of a template to find the location of the object in the image of FIG. 1A.
Figure 1C:
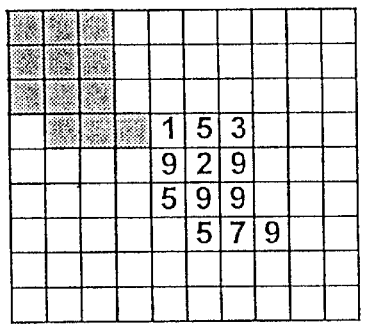
FIG. 1C shows one location of the template of FIG. 1B displaced on the image of FIG. 1A.
Figure 1D:
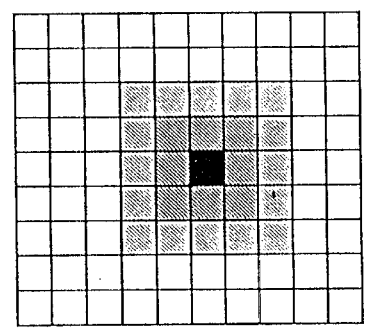
FIG. 1D shows an approximate indication of a correlation between an object in an image and a template moved around the image illustrated by the intensity of shading.
Figure 2A:
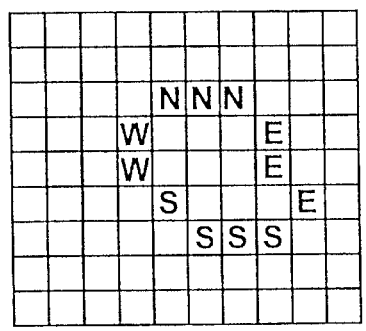
FIG. 2A is an example of a binary vector image.
Figure 2B:
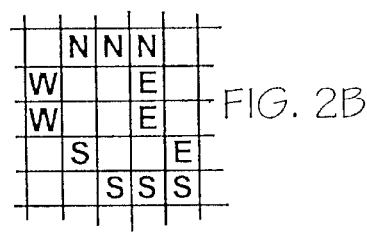
FIG. 2B is an example of a binary vector template.
Figure 2C:
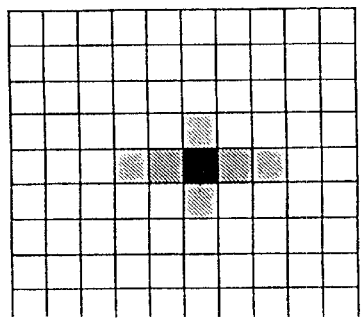
FIG. 2C shows the resulting vector correlation between an object in a binary vector image and a binary vector template moved around the image.

As illustrated in FIGS. 3A through 3D, the present invention relates to an automatic image processing system used for locating a coordinate point position of an object 20 within an image 22. The illustrated image 22 is two-dimensional with a plurality of image pixels, each image pixel having a known intensity value and a known coordinate point. The coordinate points are defined by a horizontal x-axis and a vertical y-axis. The goal of the system is to determine the coordinate position of object 20 within image 22.

Initially, the system relies on the manual determination of a possible template 24, the boundary of which has well defined edges 26. As illustrated, template 24 is shaped and dimensioned, to correspond as closely as possible to object 20.

Once template 24 has been defined, it is translated to an abstract template 28 defined by a series of N vectors $(u_1, v_1, \theta_N), (u_2, v_2, \theta_N)$ which is easily stored in memory locations of a computer. As shown schematically in FIG. 3A and in table form in FIG. 3B, each vector A through I is given as a set of coordinate points $u_i$, and $v_i$ which are respectively the horizontal and vertical coordinates (u, v) of template edges 26. The coordinate points may be mapped to the coordinate system of image 20, as discussed further below. Associated with each coordinate point is an edge direction illustrated by a corresponding arrow $\theta_i$, that is perpendicular to a corresponding edge 26 at the location of the coordinate point. The tail of each arrow lies inside the boundary of template 24 while the head of each arrow lies outside the template. To allow for equal accuracy in determining the location of object 20 along the x and y axis of image 22 there should be roughly an equal number of vectors N along substantially vertical and substantially horizontal extents of manual template 24. The same vectors may simultaneously have both a horizontal and a vertical component. As shown in FIG. 3A, three vectors exist for each horizontal and vertical extent and include more than one edge. For example, three such edges comprise the rightmost vertical extent in FIG. 3A.

To minimize computational complexity, only a limited number of edge points need to be translated into vector ($u_i$, $v_i$, $\theta_i$). However, at least one vector should preferably be used for each different edge of a manually determined template unless adjacent edges lack a sufficiently large angular difference between them. As shown in FIG. 3A, each of edges 26 include at least one vector comprising a portion of abstract template 28.

Once template 24 is converted into the vectors of abstract template 28, a ranging template 30 is formed as shown in FIG. 3C. Ranging template 30 is defined using a pair of coordinate points ($up_i$, $vp_i$) and ($un_i$, $vn_i$) for each vector ($u_i$, $v_i$, $\theta_i$) of abstract template 28. Point ($up_i$, $vp_i$) is constructed by a positive displacement $\delta$ along direction $\theta$, and point ($un_i$, $vn_i$) is constructed by a negative displacement $\delta$ along direction $\theta_i$. The former coordinate points should reside outside the boundary defined by edges 26 of manually determined template 24 while the latter coordinate points should reside inside the boundary. Mathematically, ($up_i$, $vp_i$)=($ui+\iota \cos \theta_i$, $v_i+\delta \sin \theta_i$) and ($un_i$, $vn_i$)=($u_i-\delta \cos \theta_i$, $v_i-\delta \sin \theta_i$). Before ranging template 30 can be used, however, weights must be assigned to the coordinate points of the template. For example, in the illustrated embodiment, the weights for points ($up_i$, $vp_i$) having the positive displacement are +1, and the weights for ($un_i$, $vn_i$) having the negative displacement are −1. A small open square represents a ranging template coordinate point with a negative weight and a small dark square represents a ranging coordinate template point with a positive weight.

By having weights of +1 or −1 in combination with a very sparse set of coordinate points in ranging template 30, the formula for a correlation is very simple:

$$corr(x, y) = \sum_i I(x - up_i, y - vp_i) - \sum_i I(x - un_i, y - vn_i) \quad (5)$$

where I is image 22, x and y are the coordinate points of the image, and u and v are the coordinate points of ranging template 30 as defined above. The notation in this formula is simplified by letting positive terms $P_i = I(x-up_i, y-vp_i)$ and negative terms $N_i = I(x-un_i, y-vn_i)$:

$$corr(x, y) = \sum_i P_i - \sum_i N_i \quad (6)$$

Processing speed can be enhanced if displacement $\delta$ is large, but it should be no larger than about half the smallest dimension of an edge of template 24 having at least one vector. Otherwise, computational inaccuracies may result. As illustrated in FIG. 3C, the coordinate points ($un_i$, $vn_i$) determined using vectors C and D of abstract template 28 are closely adjacent to one another. If the displacement $\delta$ were much greater, the coordinate points may extend past one another resulting in undesirable uncertainty. For example, for abstract template 28, the shortest dimension is approximately 10 units in length. The displacement $\delta$ is set to 3 units, and the resulting ranging template 30 will allow a detection of object 20 pattern even if ranging template 30 is off the center of the object by up to 3 units. Thus, object 20 can be found by sparsely searching using a 6×6 grid. However the location of object 20 in image 22 cannot be found to an accuracy greater than ±3 pixels. FIG. 3D shows a match between ranging template 30 and object 20 within image 22 even though the template is significantly off center and object 20 is significantly rotated.

FIG. 4A is a profile of the correlation using equation (6) as a function of ranging template movement along the x-axis for a non-rotated object. Ranging template 30 has a displacement $\delta=3$ units, so the maximum correlation has a width of six units. The irregular and slightly blurry edges of real objects in industrial environments in which the present invention will be used results in a gradual fall-off from the maximum correlation as it falls to a zero correlation.

Referring to FIG. 4B, another ranging template 30' can be constructed by choosing a displacement $\delta=1$ unit. The resulting ranging template 30' will allow a detection of object 20 in image 22 only if the template is off the center of object 20 by no more than one unit. Thus, object 20 can only be found by searching over every location in input image 22. However, the center of object 20 can be found to an accuracy of one unit. FIG. 4C is a profile of the correlation using equation (6) for movement of ranging template 30' with $\delta=1$ unit along the horizontal direction of the x-axis. For images in industrial environments the correlation profile approximates an inverted parabola about the peak of the correlation. It can be seen that the mathematical center of a best fitting parabola will lead to an accuracy significantly smaller than the size of a pixel.

The profiles shown in FIGS. 4A and 4C suggest that the formula for vector correlation in formula (6) may be altered according to a method of normalized correlation. The normalized formula for this invention is $$corr(x, y) = \frac{\sum_i P_i - \sum_i N_i}{\sqrt{\sum_i P_i^2 + \sum_i N_i^2 - \frac{1}{N}\left(\sum_i P_i + \sum_i N_i\right)^2}} \quad (7)$$

It can be easily verified by those skilled in the art that if the illumination value of each coordinate point representing a pixel in image 22 is multiplied by an arbitrary constant and another arbitrary constant is added to the value at each coordinate point representing a pixel then the results of the correlation corr(x,y) do not change. Thus, the normalized correlation formula produces a correlation value that is independent of light level and contrast. Furthermore, the value of the correlation is no greater than unity for a perfect correlation and no less than zero for a poor correlation.

Figure 5:
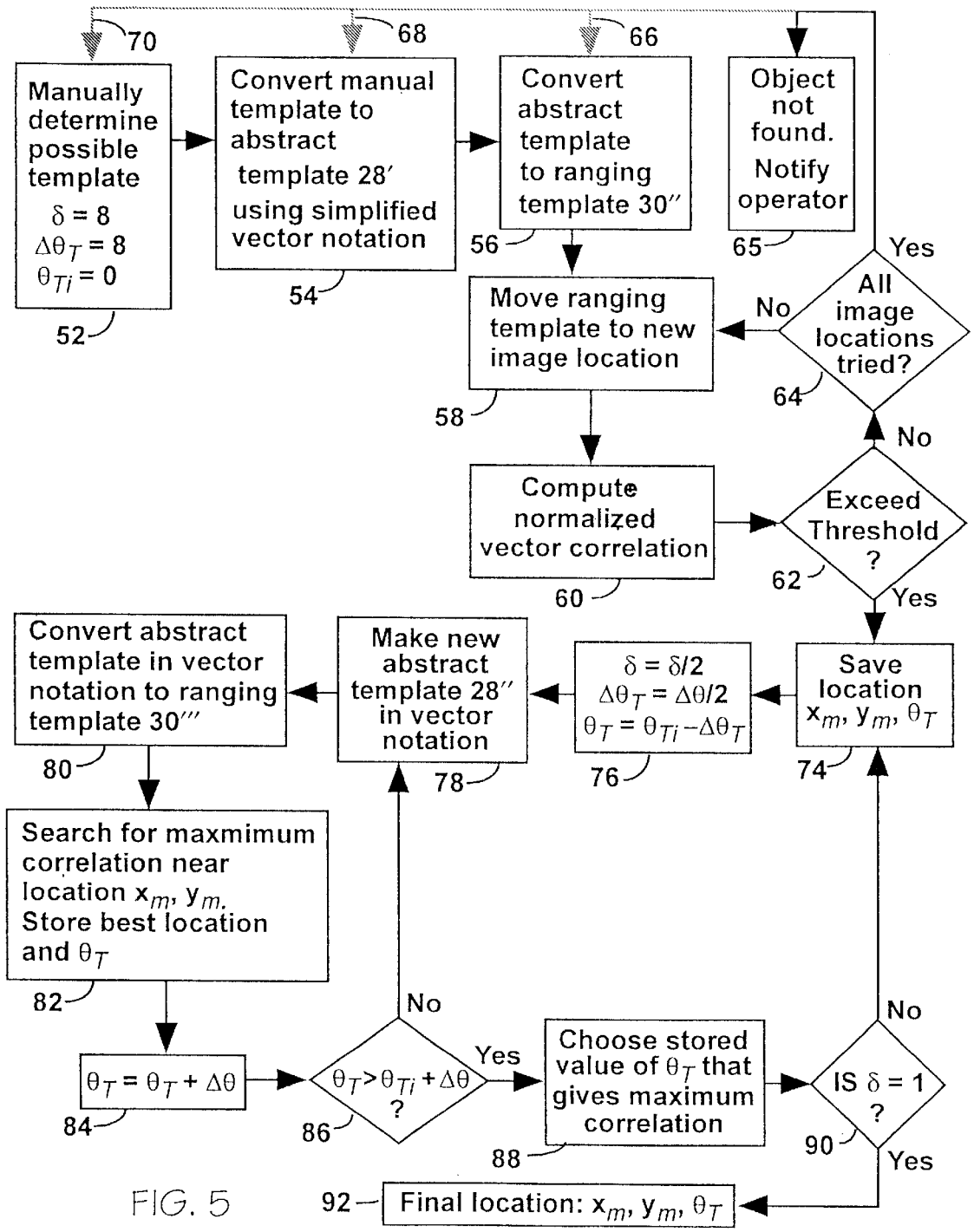
FIG. 5 is a flow diagram that shows an efficient method of searching for an object using the system of the present invention.

The dynamic operation of the system of the present invention is illustrated in the flow chart of FIG. 5. For purposes of illustration it is assumed that an object 20 to be located in an image 22 has a minimum horizontal or vertical length of approximately 16 units. The displacement $\delta$ is set to a maximum value of 8 units which is half the 16 units for the reasons discussed above. It is initially assumed that object 22 is not rotated. Therefore, a value of $\theta_{Ti}$ equals 0. Nevertheless, a possible positive change in rotation $\Delta\theta_T$ is set to a predetermined value to be used later. For purposes of illustration, it is set to 8. Then a possible template 24' is determined manually at location 52. The manual template is converted to an abstract template 28' using simplified vector notation at location 54 as discussed above. Next, abstract template 28' in vector notation form is converted to a ranging template 30'' at location 56. At location 58 ranging template 30'' is moved to a new location within image 22. Because the size of ranging template 30'' involves the use of $\delta$ at a value of 8 units, the ranging template is moved over the image in a 16 by 16 search grid and a normalized correlation computed at location 60 for each new location. After a normalized vector correlation is computed at each new location, the value is compared to a pre-set threshold at location 62. For purposes of illustration, this value is set to 0.5. If the value is less than 0.5 then the ranging template 30'' is moved to the next search location within image 22 as long as not all image locations have been tried as shown at location 64.

If all image locations have been tried and an acceptable minimum threshold is not reached then it is possible that an object 20 was not in image 22, and the system has responded correctly at location 65 in not finding an object. However, if it is verified that an object indeed exists even though the system was not able to find it, one of three options are possible as shown by dotted arrows 66, 68, and 70. Typically, a larger value of displacement δ is selected at location 56. Alternatively, more vectors may be used to convert manual template 24 to abstract template 28' at location 54. Finally, it may be necessary to manually select a different manual template 24 at location 52. Then the normalized vector notation is again computed at each of the different locations within image 22 until the threshold at location 62 is satisfied.

Once the minimum threshold value of a normalized correlation is satisfied at location 62, the location $x_m, y_m$ of ranging template 30" within image 22 at which the correlation was performed that most closely corresponds to the coordinate position of object 20 in image 22 is saved at location 74. Then, at location 76 the displacement δ is cut in half and a possible range of rotation $\Delta\theta_T$ for object 20 is also cut in half. Thus, using the information provided above, δ and $\Delta\theta_T$ are both 4. The value for $\theta_T$ corresponding to an angle of rotation for object 22 is −4 when $\theta_{Ti}$ equals 0. Using the new values, abstract template 28' is converted to a new abstract template 28" at location 78 according to standard formulae for rotating coordinate points in a two dimensional space:

new
$$u_i = *u_i \cos\theta_T - v_i \sin\theta_T \tag{8}$$

new
$$v_i = *u_i \sin\theta_T + v_i \cos\theta_T \tag{9}$$

new
$$\theta_i = \theta_i + \theta_T \tag{10}$$

The angles of the edge directions in the abstract template are also rotated: Then, new abstract template 28" is converted to a new ranging template 30" as shown at location 80 of the flowchart of FIG. 5. Unlike the initial grid size of 16 by 16 for ranging template 30", the grid size is half or 8 by 8 for ranging template 30'''. By moving ranging template 30''' to different locations around originally stored location $x_m, y_m$ as shown at flow chart location 82, a maximum normalized correlation can be determined for a more accurate specification of $x_m, y_m$ with the best location corresponding to the maximum normalized correlation for that value of $\theta_T$ stored. As shown at location 84, $\theta_T$ is then recomputed taking the last value of $\theta_T$ and adding the value of $\Delta\theta_T$ determined at location 76. As long as $\theta_T \leq \theta_{Ti} + \Delta\theta_{Ti}$ as required at flow chart location 86, the steps at locations 78, 80, 82 and 84 are repeated. Thus, for the illustration, maximum correlation values are saved for three different ranging template locations $x_m, y_m$ in image 22 corresponding to different values of $\theta_T$ of −4, 0, and +4. The stored value of $\theta_T$ that gives the maximum correlation for δ=4 is determined at location 88 and the corresponding determination of the location of object 22 by ranging template 30''' is saved at location 74 as $x_m, y_m$ and $\theta_{Ti}$. The location and angle of the strongest correlation of template 30''' with displacement δ=4 becomes the starting point for a new searching using a ranging template 30''' having a yet smaller displacement δ=2 units. Angles of rotation $\theta_T$=−2, 0, and +2 degrees from the previous best angle are used to find a better approximation of the rotation $\theta_T$ and location $x_m, y_m$.

Smaller displacements and angles are used to calculate new ranging templates from abstract template 28 and the search for the pattern of interest is continued in a likewise manner until displacement δ is at a predetermined minimum value. The value shown in the flowchart at location 90 is 1. Once the displacement is 1, the system of the present invention stops having determined a coordinate location $x_m, y_m$ of object 20 within image 22 corresponding to an appropriate angle of rotation $\theta_T$ as shown at location 92. Those skilled in the art will recognize a portion of the above procedure as similar to a method for locating a maximum value of a function in a multidimensional space. Gradient methods in multidimensional spaces are discussed in *Numerical Recipes the Art of Scientific Computing*, by W. Press, B Flannery, S. Teukolsky, and W. Vetterling, Chapter 10, Cambridge University Press, 1986, which is incorporated by reference.

The use of edge detection and pattern searching in one operation reduces the need for complex computer manipulation while providing great flexibility. Thus, a great advantage to using an abstract template 28 with simplified vector notation is that it can be easily altered dynamically to produce a wide range of different ranging templates 30 which can be moved to different locations around image 22 with ever increasing resolution. The location $x_m$, $y_m$ and angle of rotation $\theta_T$ of an object 20 within an image 22 can be pinpointed quickly with a desired accuracy without having to store each of the coordinate locations and corresponding brightness of each point comprising the edges 26 for the originally manually determined template 24.

Preferably, the system of the present invention may be implemented using standard computer hardware and software known to those skilled in the art. Object 20 of image 22 may be displayed on a normal screen of a cathode ray tube ("CRT"). The system may be loaded as software by means of various storage media including, but not limited to, magnetic discs and tapes, optical drives, compact disc drives, and paper.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. For use in an automatic image processing system, a method for locating a position of an object within an image, the image defined by a plurality of image pixels, each image pixel having a known intensity value and a known coordinate point, comprising the steps of:

determining a template corresponding to an estimation of the object;

translating said template to an abstract template by defining said abstract template using a number of vectors comprising a set of coordinate points and corresponding edge directions, each coordinate point lying on an edge of said template and a corresponding edge direction passing through said coordinate point perpendicular to said edge at said coordinate point, and using vectors along substantially vertical and substantially horizontal extents of said template;

minimizing said number of said vectors;

selecting at least one vector for each different edge of said template only where a sufficiently large angular difference exists between adjacent edges;

converting said abstract template to a ranging template;

displacing said ranging template to each of a plurality of known coordinate point locations within said image; and correlating said ranging template with said image at each of said locations until a maximum correlation is located, wherein the location corresponding to said maximum correlation indicates the position of the object.

2. The method as recited in claim 1, wherein said correlating step further includes determining whether a correlation has exceeded a predetermined threshold.

3. The method of claim 1 wherein the step of converting said abstract template into a ranging template further includes the steps of:

determining a displacement defined from said coordinate points of said vectors and extending along corresponding edge directions;

positioning, for each vector of said abstract template, a pair of coordinate points spaced from said coordinate point for said vector along said corresponding edge direction, a positive coordinate point corresponding to a positive value of said displacement and a negative coordinate point corresponding to a negative value of said displacement.

* * * * *